United States Patent [19]

Ito et al.

[11] Patent Number: 5,286,239
[45] Date of Patent: Feb. 15, 1994

[54] ROTATION TRANSMITTING DEVICE HAVING DIFFERENTLY ROTATING OUTPUT SHAFTS

[75] Inventors: Kenichiro Ito; Hiromi Nojiri; Kenro Adachi, all of Iwata, Japan

[73] Assignee: NTN Corporation, Osaka, Japan

[21] Appl. No.: 997,749

[22] Filed: Dec. 30, 1992

Related U.S. Application Data

[62] Division of Ser. No. 834,955, Feb. 14, 1992, Pat. No. 5,203,232.

[30] Foreign Application Priority Data

| Feb. 18, 1991 | [JP] | Japan | 3-023278 |
| Mar. 28, 1991 | [JP] | Japan | 3-064788 |
| Aug. 29, 1991 | [JP] | Japan | 3-218707 |

[51] Int. Cl.$^5$ ............................. F16H 35/04
[52] U.S. Cl. ................. 475/231; 475/230; 475/243; 475/244; 192/50; 192/49; 74/650
[58] Field of Search ............... 475/230, 231, 243, 244, 475/246, 247; 192/43.2, 44, 48.92, 49, 50; 74/650

[56] References Cited

U.S. PATENT DOCUMENTS

| 2,121,915 | 6/1938 | Ifield | 475/231 R |
| 2,700,310 | 1/1955 | Viebrock et al. | 74/650 R |
| 3,173,309 | 8/1963 | Seliger | 74/650 |
| 3,359,803 | 12/1967 | Long | 74/650 |
| 3,448,636 | 6/1969 | Roper et al. | 475/231 X |
| 4,031,779 | 6/1977 | Braune | 74/650 |
| 4,782,720 | 11/1988 | Teraoka et al. | 74/650 |
| 4,989,476 | 2/1991 | Shimada et al. | 74/650 |
| 5,044,229 | 9/1991 | Visentini | 74/650 |
| 5,171,192 | 12/1992 | Schlosser et al. | 475/230 X |

*Primary Examiner*—Leslie A. Braun
*Assistant Examiner*—Daniel Wittels
*Attorney, Agent, or Firm*—Nikaido, Marmelstein, Murray & Oram

[57] ABSTRACT

A rotation transmitting device having an outer ring formed with a bore, a holder fixedly mounted in the bore and rolling elements mounted in the holder so as to be rollable as the outer ring rotates. A pair of input shafts are provided coaxially with an axis of rotation of the outer ring so as to sandwich the rolling elements from both sides thereof. Output shafts are rotatably mounted in the bore at both sides of the input shafts. Cages are rotatably mounted between the output shafts and the outer ring and formed with pockets. Engaging elements are mounted in the pockets and adapted to be engageable between opposite surfaces of the outer ring and the output shafts with relative rotation between the cages and the output shafts in either direction. Elastic members are mounted in the pockets to keep the engaging elements in a position where they are not engaged. The cages and the output shafts are coupled to the respective input shafts so that a driving force can be transmitted between the input shafts and the output shafts. The input shafts and the output shafts are coupled together with gaps formed therebetween in the direction of rotation.

2 Claims, 13 Drawing Sheets

ROTATION TRANSMITTING DEVICE HAVING DIFFERENTLY ROTATING OUTPUT SHAFTS

This is a division of application Ser. No. 834,955 filed Feb. 14, 1992 now U.S. Pat. No. 5,203,232, Issued Apr. 20, 1993.

BACKGROUND OF THE INVENTION

1. Field of the Invention

This invention relates to a rotation transmitting device which can be used e.g. as a differential of an automobile.

2. Description of the Related Art

A differential of an automobile comprises an opposed pair of side gears coupled to output shafts such as axles and pinion gears coupled to an input member coupled to the propeller shaft. If there is a difference in revolving speed between the right and left wheels, the pinion gears rotate between the side gears, thus transmitting a driving torque to the respective output shafts according to the loads on the respective wheels.

But with such a simple differential comprised merely of side gears and pinion gears meshing with each other, if one of the wheels should get off the track or move onto a frozen or snow-covered surface so that the load thereon should drop sharply, the turning torque is distrubuted only to the idling un-loaded wheel, whereas torque transmission is completely shut off to the wheel still gripping the road surface.

In order to cope with this problem, many devices have been proposed which limit the differential function of a differential. As typical examples, there are known a differential having a viscous coupling adapted to distribute the driving torque to the wheel under high load making use of the shearing resistance of a high-viscosity fluid and a differential having a plurality of friction plates and elastic members adapted to retard the movement of the side gears and thus to transmit the driving torque to both output shafts.

But in the former arrangement using a viscous coupling, while the difference in revolving speed between the output shafts is small, the shearing resistance of the high-viscosity fluid is small, so that no sufficient driving torque is obtainable. If attempt is made to increase the shearing resistance while the revolving speed is low, a dragging torque tends to appear while the car is turning a tight corner at a low speed.

On the other hand, in the latter arrangement using friction plates, the internal structure of the differential tends to be complicated and heavy. When the car turns a tight corner with the friction plates in operation, a dragging torque will be produced by the frictional force on the side gears.

SUMMARY OF THE INVENTION

An object of the present invention is to provide a rotation transmitting device which is simple in structure, which has both the differential function and the differential limiting function (limited slip function) and which can absorb any speed difference between the output shafts without producing producing dragging torque.

In order to solve the above problems, this invention provides as a first means a rotation transmitting device comprising an outer ring having a bore, a holder fixedly mounted in the bore, rolling elements mounted in the holder so as to be rollable as the outer ring rotates, a pair of input shafts provided coaxially with an axis of rotation of the outer ring so as to sandwich the rolling elements from both sides thereof, output shafts rotatably mounted in the bore at both sides of the input shafts, cages rotatably mounted between the output shafts and the outer ring and formed with pockets, engaging elements mounted in the pockets and adapted to be engageable between opposite surfaces of the outer ring and the output shafts with relative rotation between the cages and the output shafts in either direction, and elastic members mounted in the pockets for keeping the engaging elements in a position where they are not engaged, the cages and the output shafts being coupled to the respective input shafts so that a driving force can be transmitted between the input shafts and the output shafts, the input shafts and the output shafts being coupled together with gaps formed therebetween in the direction of rotation.

Also, the present invention provides as a second means a rotation transmitting device comprising a rotation transmitting device comprising a pair of output shafts, a pair of side gears opposed to the output shafts, an input member, pinion gears coupled to the input member and meshing with the side gears, one of the side gears being coupled to one of the side gears and the other being separated from the other of the output shafts, the other of the output shafts and the input member being provided on their surfaces opposite to each other with engaging surfaces, a cage rotatably mounted between the engaging surfaces and having pockets formed therein, engaging elements mounted in the pockets and adapted to engage the engaging surfaces when the cage and the other of the output shaft rotate relative to each other, and elastic members mounted in the pockets for keeping the engaging elements out of engagement with the engaging surfaces, an intermediate shaft provided coaxially with the other of the output shafts, the cage and the other output shaft and the other side gear being coupled together through the intermediate shaft so that turning torque can be transmitted therebetween, the intermediate shaft and the other of the output shafts being loosely coupled together with gaps formed therebetween in the direction of rotation.

Also, the present invention provides as a third means a rotation transmitting a device comprising a rotation transmitting device comprising a differential comprising a case, an opposed pair of side gears, and pinion gears rotatable together with the case and meshing with the side gears, a pair of output shafts coupled to the respective side gears, a pair of outer rings rotatably mounted on the output shafts, cages provided between the respective output shafts and the outer rings and adapted to rotate together with the output shafts or the outer rings with gaps formed in the direction of rotation therebetween, the cages having pockets, engaging elements mounted in the pockets and engageable between opposing surfaces of the output shafts and the outer rings when the output shafts and the cages rotate relative to each other either clockwise or counterclockwise, elastic members mounted in the pockets for keeping the engaging elements in their neutral position where the engaging elements are out of engagement with the opposing surfaces, the case of the differential and the outer rings being coupled to the input shaft so as to be rotatable together, transmission means provided at the coupling portions for increasing the revolving speeds of both the outer rings, and differential means for producing a revolving speed difference between the cages and the output shafts or the outer rings coupled thereto.

In the first means, when the outer ring rotates, the input shafts are rotated through the rolling elements at the same speed and the cages rotate relative to the output shafts by a distance equal to the size of the gap extending in the direction of rotation at the coupling portions. Thus, the engaging elements engage between the opposite surfaces of the outer ring and the output shafts, allowing the outer ring and the output shafts to rotate together.

In this state, if the rotation of the output shafts becomes higher than the rotation of the outer ring, the output shafts move ahead of the cages by a distance equal to the size of the gaps at the coupling portions. The engaging elements are thus moved back from the engaging position, leaving the output shafts idling, separate from the outer ring.

On the other hand, if there is a difference in revolving speed between the respective output shafts, the output shaft rotating faster than the outer ring is made to be idle in the manner as described above. This motion of the output shaft is transmitted through the cage and the input shaft to the rolling elements and acts to increase their revolving speed. This motion of the rolling elements in turn serves to reduce the rotation of the input shaft on the other side. Thus, the cages will rotate slower than the output shafts and the engaging elements are disengaged, separating the output shafts and the outer ring from each other.

In the second means, as the input member rotates, the intermediate gear is rotated through the side gears, so that the cage rotates relative to the output shafts by a distance equal to the size of the gaps at the coupling portions and the engaging elements engage the engaging surfaces. Thus, one of the output shafts is driven directly by the input member while the other output shaft is driven through the pinion gear and the side gear.

In this state, if the rotation of one of the output shafts coupled to the intermediate shaft exceeds the rotation of the input member, the output shafts overrun the engaging elements, thus separating the output shafts and the input member from each other. In contrast, if the rotation of the other output shaft exceeds the rotation of the input member, the side gear coupled to the intermediate gear is rotated in the opposite direction by the pinion gear being rotated by the movement of this output shaft, thus disengaing the engaging elements. Now both the output shafts are controlled only on the differential function by the pinion gears and the side gears.

If one of the output shafts falls into unloaded condition, the intermediate gear is rotated by the pinion gears and the engaging elements engage. One of the output shafts is thus driven directly by the input member. In this case, since no load is applied to the pinion gears and the side gears, the input member, pinion gears and side gears rotate together (with differential locked). Thus, the driving torque can be distributed to the loaded output shaft, too.

In the third means, when the differential and the outer rings are rotated by the input shaft, the transmission means serve to rotate the outer rings faster than the output shafts. Also, the cages and the output shafts or outer rings are rotated relative to each other by the differential means, the moving the engaging elements into engaging operative position.

In this state, while the rotation of the output shafts is lower than that of the outer rings, the outer rings overrun, keeping the clutch disengaged. The rotation of the input shaft is transmitted to the output shafts through the differential. On the other hand, if the rotation of the output shafts exceeds that of the outer rings, the engaging elements engage, so that the rotation of the input shaft is transmitted from the outer rings directly to the output shafts, thus locking the differential.

In this arrangement, the engaging elements can engage for both directions of relative rotation between the output shafts and the outer rings. Thus, the differential limiting function can be activated for both directions of rotation.

Also, since the engaging elements are maintained ready for engagement without a play, the clutch can be engaged instantly. This permits shock-free smooth changeover.

In the rotation transmitting device according to this invention, a mechanical clutch is mounted between the input member and the output shafts. If there is a difference in revolving speed between the output shafts, the output shafts are separated from the input member, allowing them to rotate freely. If the output shafts are in a no-load state, the engaging elements engage, locking the differential function. This device has both the differential function and the differential limiting function in spite of its very simple structure. This makes it possible to reduce the size of the driving system.

Further, by utilizing the mechanical engagement of the engaging elements, even a slight difference in revolving speed between the output shafts can cause the input member and the output shafts to be separated from each other. Thus, no dragging torque develops unlike the structure in which a high-viscosity oil or a friction plate is used. This ensures smooth differential motion and driving torque transmission. Even while the revolving speed is low, a large driving force can be transmitted.

BRIEF DESCRIPTION OF THE DRAWINGS

Other features and objects of the present invention will become apparent from the following description taken with reference to the accompanying drawings, in which.

DESCRIPTION OF THE PREFERRED EMBODIMENTS

FIGS. 1-7 show the first embodiment.

Figure 8:
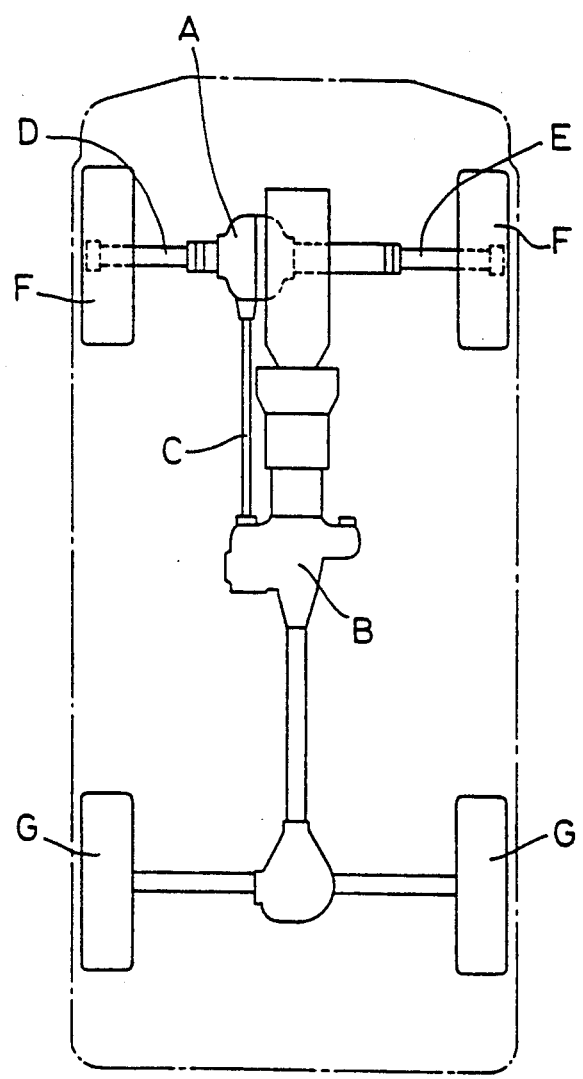
FIG. 8 is a view of the same showing how it is mounted on the driving system of a car.

A rotation transmitting device A of this embodiment is mounted on a basically rear drive type 4-wheel vehicle as shown in FIG. 8 as a front differential for transmitting the driving force from a drive shaft C extending from a transfer B to the axles D and E of the front wheels.

Figure 1:
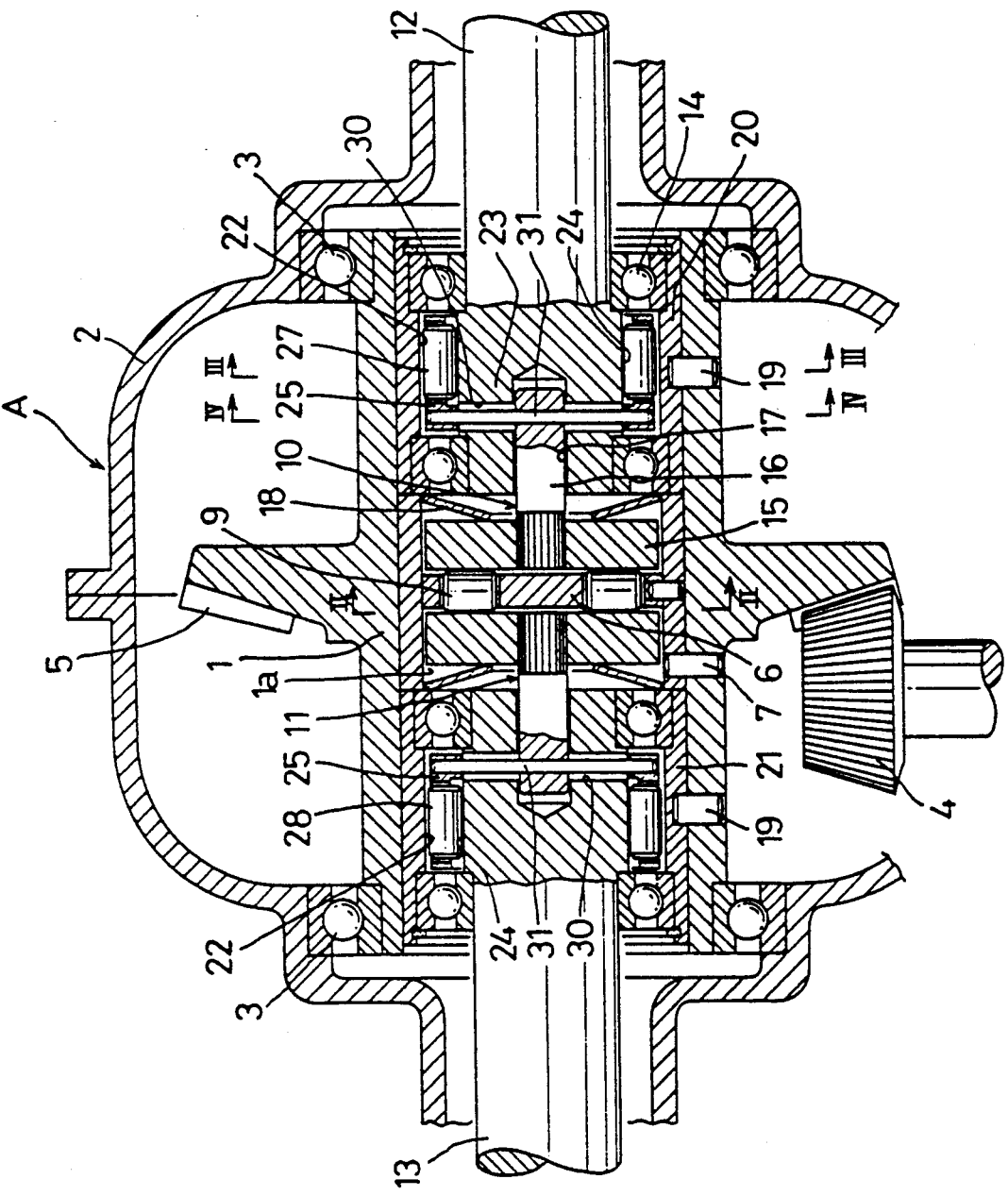
FIG. 1 is a vertical sectional front view of a portion of a first embodiment.

As shown in FIGS. 1 and 8, an outer ring 1 has both ends of its outer periphery rotatably supported in a case 2 through bearings 3. The outer ring 1 is integrally provided at its central portion with a ring gear 5 meshing with a pinion gear 4 provided at the tip of the drive shaft C.

Figure 2:
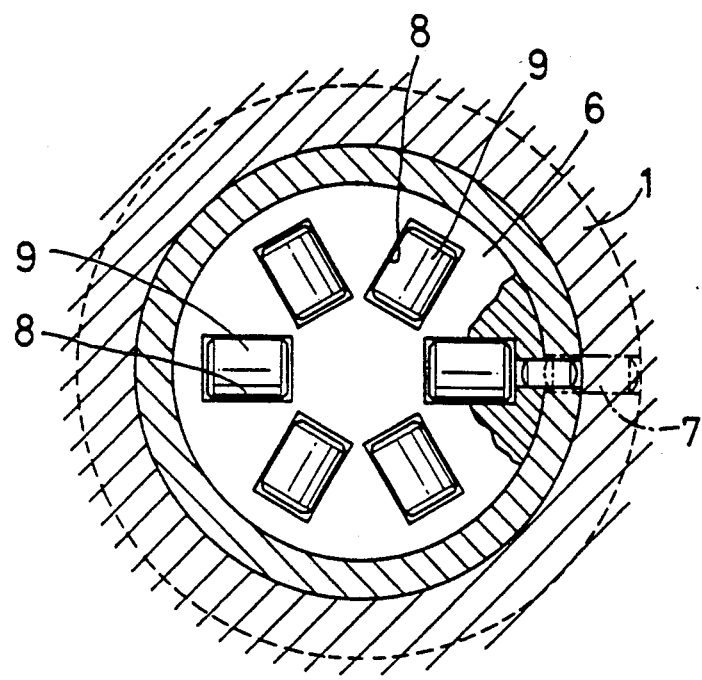
FIG. 2 is a sectional view taken along line II—II of FIG. 1.
Figure 3:
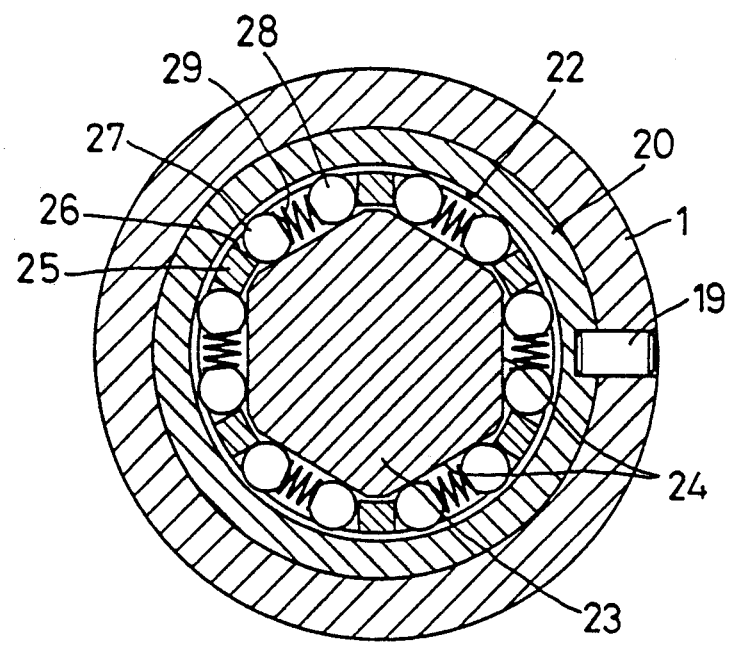
FIG. 3 is a sectional view taken along line III—III of FIG. 1.

A disk-shaped holder 6 is fixedly mounted in a bore 1a formed in the outer ring 1 by a pin 7. As shown in FIG. 2, the holder 6 is provided with a plurality of pockets 8 arranged symmetrically with respect to the center thereof and at circumferentially equal intervals.

A roller 9 as a rolling element is mounted in each pocket 8. The rollers 9 are oriented so that their axes extend toward the center of the holder 6 and are adapted to roll in the same direction as that in which the outer ring 1 rotates.

At both sides of the rollers 9, a pair of input shafts 10 and 11 are provided as shown in FIG. 1. On the input shafts 10 and 11, output shafts 12 and 13 are rotatably mounted, respectively, through bearings 14.

Each of the input shafts 10 and 11 comprises a disk 15 abutting the rollers 9 and a shaft 16 secured to the disk 15 by a spline or the like. The shafts 16 are rotatably inserted into guide holes 17 formed in the output shafts 12 and 13. Elastic members 18 are mounted between the disks 15 and the bearings 14 supporting the output shafts 12, 13 to urge the disks against the bearings to prevent slip between the disks 15 and the rollers 9.

Sleeves 20 and 21 are fixed by pins 19 to the inner peripheral surface of the bore 1a in the outer ring 1 so as to oppose to the output shafts 12 and 13. Cylindrical engaging surfaces 22 are formed on the inner peripheral surface of each of the sleeves 20 and 21.

On the other hand, the peripheral surfaces of the output shafts 12 and 13 at a portion facing the engaging surfaces 22 are formed into square shanks 23. (FIG. 3) The outer peripheral surface of each square shank 23 is formed with a plurality of engaging surfaces 24 which form wedge cam surfaces in cooperation with the engaging surface 22.

Between the engaging surface 22 and the engaging surface 24, annular cages 25 are rotatably mounted. They are provided with a plurality of pockets 26 so as to correspond to the engaging surfaces 24 on the output shafts 12 and 13. In each pocket 26, a pair of rollers 27 and 28 as engaging elements and an elastic member 29 for pressing the rollers 27 and 28 against the side faces of the pocket 26.

Between the rollers 27 and 28 and the engaging surfaces 22, a gap is formed in an ordinarily assembled condition. When the cages 25 rotate in either direction relative to the output shafts, they will push the rollers 27 and 28, thus bringing one of the rollers into engagement between the engaging surfaces 22 and 24.

Figure 4:
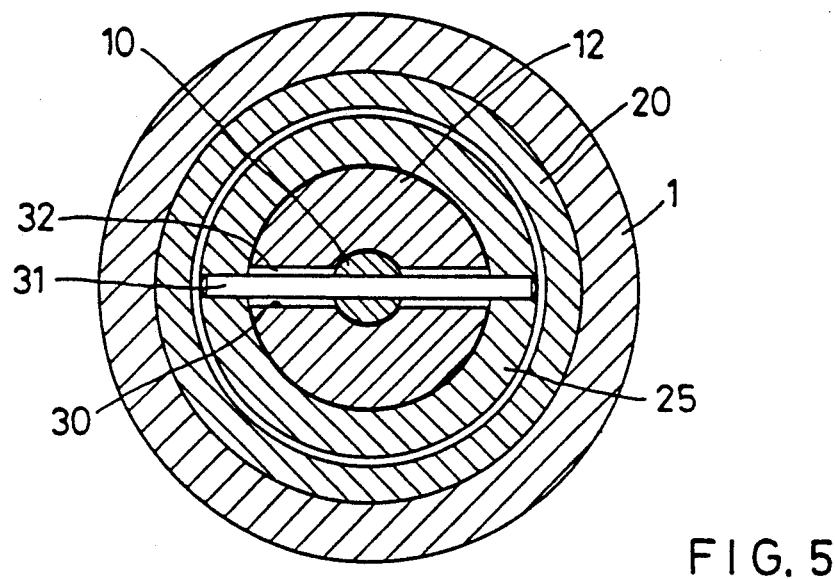
FIG. 4 is a sectional view taken along line IV—IV of FIG. 1.

The cages 25 are coupled to the input shafts 10 and 11 by pins 31 inserted through pin holes 30 formed in the output shafts 12 and 13, as shown in FIG. 4. The pins 31 are tightly fitted in the cages 25 and the input shafts 10 and 11. But some gap 32 is formed in the direction of rotation between the pins 31 and the pin holes 30 in the output shafts 12, 13. The size of the gap 32 is equal to the distance by which the rollers 27 and 28 move from their neutral position until they contact the engaging surfaces 22 and 24.

In operation, as shown in FIGS. 1 and 8, the rotation transmitting device A is mounted so that the driving force from the engine will be transmitted to the outer ring 1 through the ring gear 5 and the pinion gear 4. The axles D and E carrying the front left wheel and front right wheel F are coupled to the ends of the output shafts 12 and 13, respectively.

Figure 5:
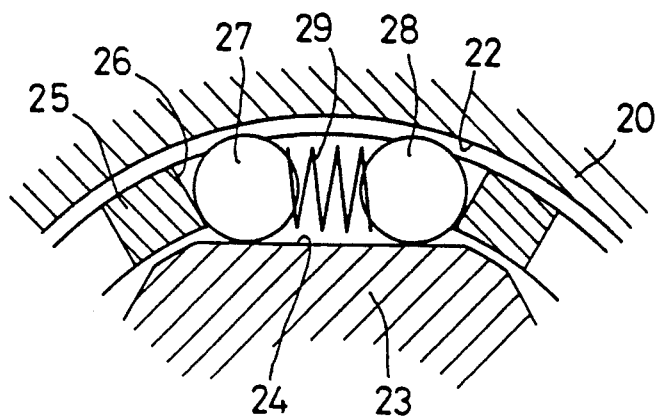
FIGS. 5–7 are sectional views showing the operation of the same.

As shown in FIG. 5, in the inoperative state where no driving force is transmitted and the rollers 27 and 28 are in their neutral position between the outer ring 1 and the output shafts 12 and 13, when the rear wheels G are driven, the drive shaft C will rotate simultaneously. Thus, the outer ring 1 is rotated together with the holder 6.

As the holder 6 rotates, the same turning torque is applied to the disks 15 of the input shafts 10 and 11 through contact with the rollers 9. Thus, the left and right input shafts 10 and 11 rotate at the same speed as the outer ring 1.

Figure 6:
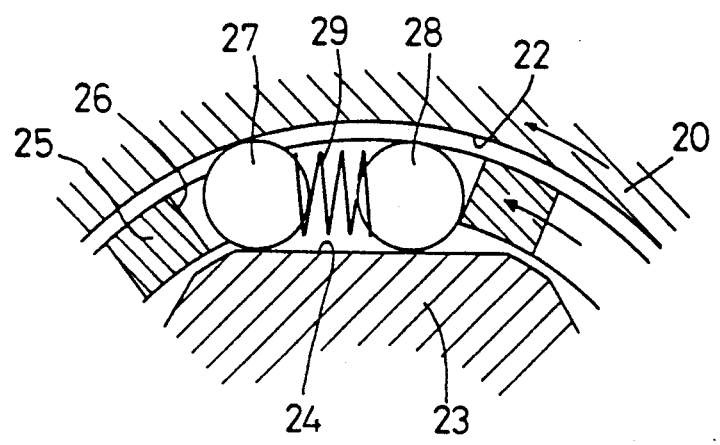

As the input shafts 10 and 11 rotate, as shown in FIG. 6, the cages 25 will rotate relative to the output shafts 12 and 13 by a distance equal to the size of the gap 32 formed in the direction of rotation around the pins 31, thus moving the rollers 27 and 28 into engagement with the engaging surfaces 22 and 24. In this state, when the automobile is at a stop, the output shafts are not turning. Thus, the rollers 27 are wedged into between the engaging surfaces 22 and 24 as the outer ring 1 rotates, so that the rotation of the drive shaft C will be transmitted to the front wheels through the rollers and the output shafts.

When the car is moving straight ahead, since the rear and front wheels are rotating at the same speed, the drive shaft C and the front wheels D and E should be rotating at the same speed as well. But actually, since the driving wheels, that is, rear wheels slip, the vehicle speed tends to be slightly lower than the rear wheel speed. Thus, the drive shaft C rotates slightly faster than the front wheels, so that the outer ring 1 rotates faster than the output shafts 12 and 13. This causes the rollers 27 to engage, coupling the outer ring 1 and the output shafts 12 and 13 together. Thus, the front wheels are driven, so that the vehicle is now in the four-wheel drive mode.

If the rear wheels slip, too, the vehicle speed drops, so that the rotation of the front wheels (or output shafts)

becomes lower than the rotation of the drive shaft (or outer ring). Thus, the rollers 27 and 28 will engage the outer ring 1 and the output shafts 12 and 13 and the car will be in the four-wheel drive mode.

On the other hand, when the car is making e.g. a left turn in FIG. 8, i.e. when there is a difference in rotation between the right and left front wheels, the outer ring 1 rotates at the same speed as the drive shaft C through the ring gear 5. But the output shaft 13, which is coupled to the inner front wheel with respect to the turning direction, rotates slower than the outer ring 1, while the output shaft 12, which is coupled to the outer front wheel with respect to the turning direction, rotates faster than the outer ring.

Figure 7:
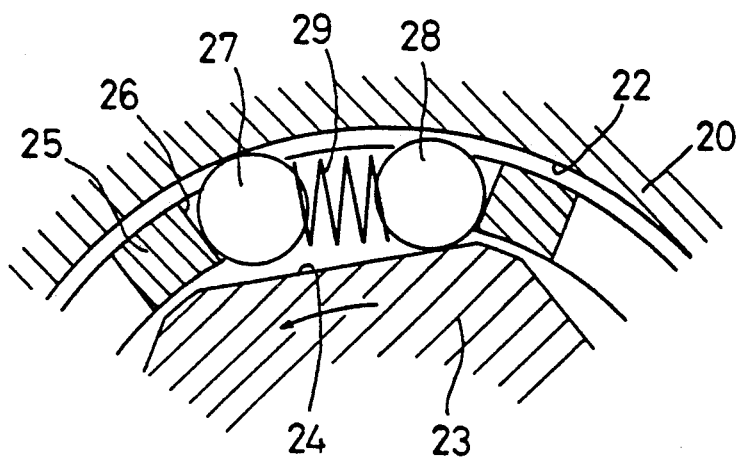

In this case, since the output shaft 12 is rotating faster than the outer ring 1, as shown in FIG. 7, the output shaft 12 rotates ahead of the cage 25 by a distance equal to the size of the gap 32 formed in the direction of rotation. Thus, the rollers 27, which have been in engaging position, will return to neutral position due to the relative rotation between the output shaft and the cage, so that the output shaft 12 is allowed to overcome or rotate separately from the outer ring 1.

As described above, if the output shaft 12 rotates faster than the outer ring 1, the cage 25, pin 31 and input shaft 10 coupled to this output shaft rotate faster than the outer ring 1. Thus, the rollers 9 at the central part of the outer ring 1 are subjected to a turning torque from the input shaft 10 which acts in such a direction as to accelerate the rollers and thus roll or spin from the one input shaft 10 toward the other input shaft 11.

The rolling of the rollers 9 serves to decelerate the rotation of the input shaft 11, thus retarding the rotation of the input shaft and the cage 25 coupled thereto with respect to the outer ring 1. Thus, in FIG. 5, the cage 25 turns in a reverse direction, bringing the rollers 27 back into their neutral position. This causes the output shaft 13 to idle, too, preventing both of the front wheels from being driven forcibly because they are separated from the drive shaft C while turning.

Since no driving force is transmitted to either front wheel while turning, the vehicle is driven by the two rear wheels only. But if the rear wheels should slip while turning, the rotation of the outer front wheel with respect to the turning direction drops below the rotation of the drive shaft C, so that the rotation of the outer ring increases relatively. In this state, when the rotation of the outer ring 1 exceeds the rotation of the output shaft coupled to the front wheel at the outside of the turning direction of the car, the rollers 27 and 28 engage the engaging surfaces 22 and 24 in the manner as described above. The driving force is now transmitted to the front wheels and the vehicle is driven by the four wheels.

As described above, in this embodiment, while the vehicle is moving straight ahead, it is driven on the four-wheel mode and on two-wheel mode while turning. If the rear wheels should slip while moving straight or while turning, the drive mode will automatically change to the four-wheel drive. This ensures a safe and reliable drive.

If the direction of rotation of the drive shaft C is reversed, the cage will move in an opposite direction, thus moving the rollers 27 and 28 into the opposite engaging position. Thus, the changeover between the two-wheel and four-wheel drive modes can be carried out in exactly the same manner when the car is moving either forward or backward.

Figure 9:
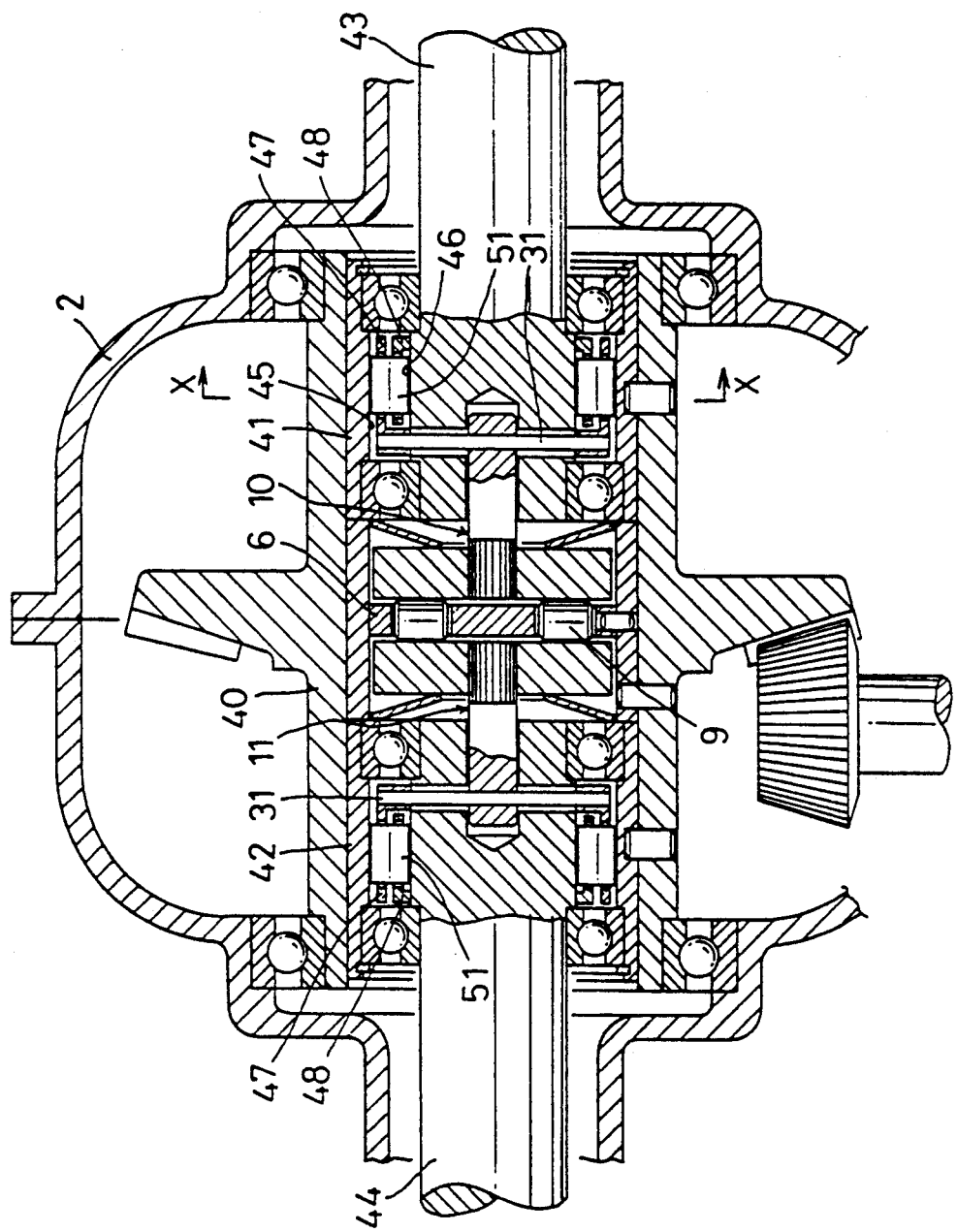
FIG. 9 is a vertical sectional front view of a portion of a second embodiment.
Figure 10:
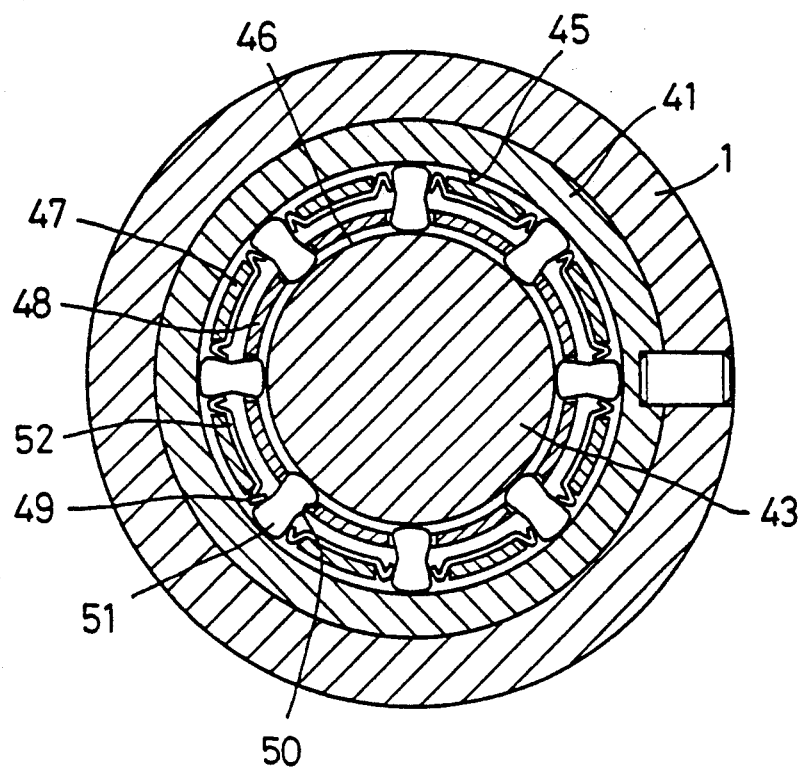
FIG. 10 is a sectional view taken along line X—X of FIG. 9.
Figure 11:
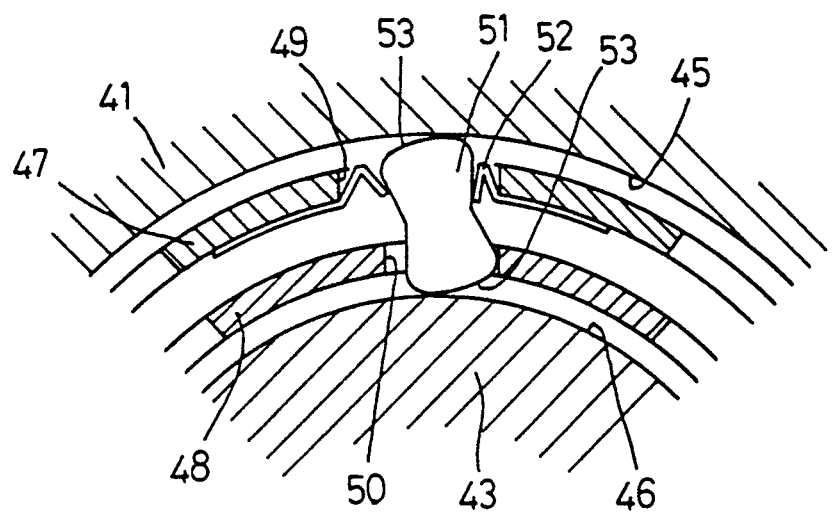
FIG. 11 is a sectional view showing the operation of the same.

FIGS. 9 to 11 show the second embodiment, in which engaging surfaces 45 and 46 are formed on the inner peripheral surfaces of sleeves 42 secured to an outer ring 41 and on the outer peripheral surfaces of output shafts 43 and 44, respectively. Between the engaging surfaces 45 and 46, rotatable large-diameter control cages 47 and small-diameter fixed cages 48 fixed to the output shafts 43, 44 are mounted.

The cages 47 and 48 are provided with a plurality of pockets 49 and 50 in their respective peripheral surfaces so as to be opposite to each other. (FIG. 10) Sprags 51 as engaging elements are mounted in the pockets 49 and 50. Elastic members 52 are provided to press both sides of the sprags 51 to keep them in their neutral position. Each sprag 51 has its outer and inner peripheral surfaces formed into arcuate surfaces 53 of which the respective centers of curvature are located on the central axis of the sprag. If the sprags incline either clockwise or counterclockwise, they will engage the engaging surfaces 45 and 46, thereby coupling together the outer ring 41 and the output shafts 43 and 44.

Otherwise, this embodiment has the same structural features as the first embodiment. Like parts are denoted like numerals and their description is omitted.

In this arrangement, if the outer ring 41 and the input shafts 10 and 11 rotate faster than the output shafts 43 and 44, as shown in FIG. 11, the control cages 47 will rotate relative to the output shafts 43 and 44. By the relative rotation between the cages 47 and 48, the sprags 51 will incline into their engaging operative position.

FIGS. 12-15 show the third embodiment.

Figure 16:
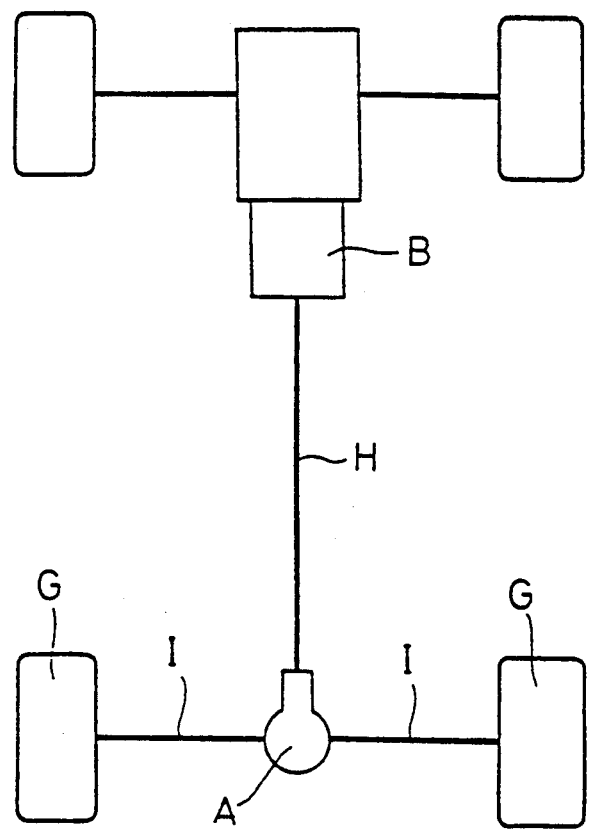
FIG. 16 is a view of the same mounted on the driving system of a car.

A rotation transmitting device A of this embodiment is mounted on an automobile driven by the rear wheels G as shown in FIG. 16 as a rear differential for transmitting the driving force of the propeller shaft H extending from the transfer B to the axles I of the rear wheels G.

Figure 12:
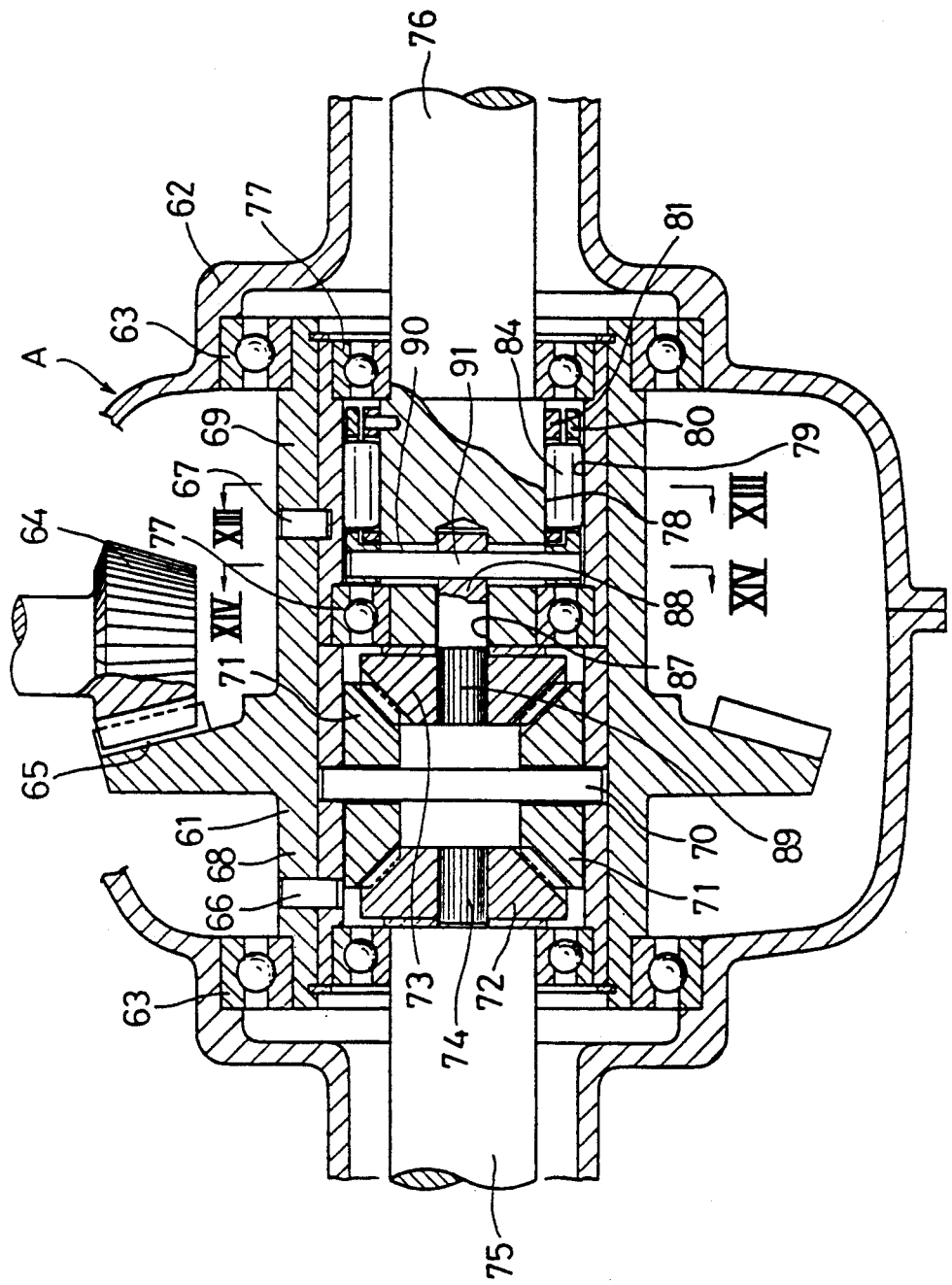
FIG. 12 is a vertical sectional view of a portion of a third embodiment.
Figure 13:
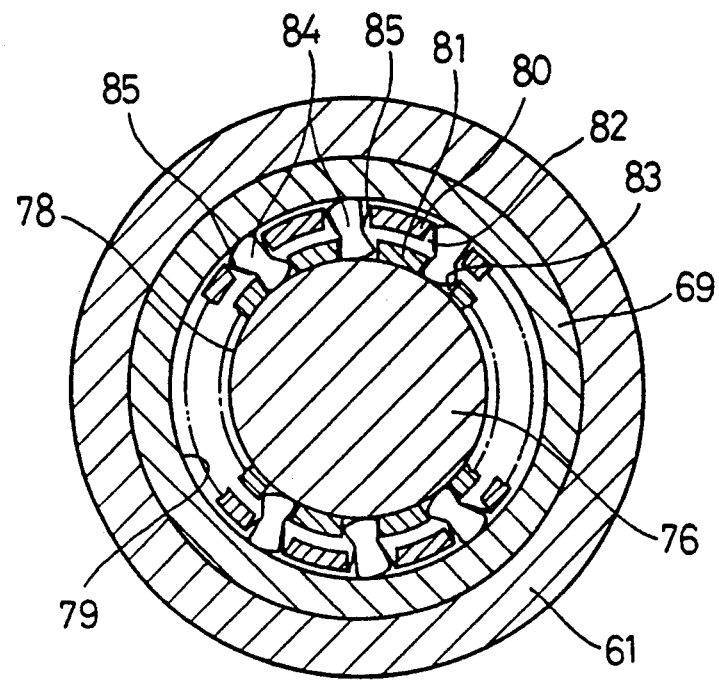
FIG. 13 is a sectional view taken along line XIII—XIII of FIG. 12.

As shown in FIG. 12, in this embodiment, a cylindrical input member 61 is rotatably mounted through bearings 63 in a case 62 secured to the car. The input member 61 is integrally provided on the outer peripheral surface thereof at its center with a ring gear 65 which meshes with a drive pinion 64 provided at the end of the propeller shaft H.

The input member 61 has a bore 61a in which sleeves 68 and 69 are secured thereto by fixing pins 66 and 67. A support shaft 70 extends between diametrically opposite portions of the inner peripheral surface of the sleeve 68 and rotatably carries an opposed pair of pinion gears 71. Two side gears 72 and 73 are provided at both sides of the pinion gears 71 in opposite relation to each other. The side gears 72 and 73 are in meshing engagement with the pinion gears 71 so that the pinion gears will rotate about the side gears.

Of the two side gears, the left one 72 is fastened to a left output shaft 75 through a press-fitted spline 74, while the right one 73 is separated from a right output shaft 76, which is rotatably supported on the sleeve 69 of the input member 61 through bearings 77.

Cylindrical engaging surfaces 78 and 79 are formed on the outer peripheral surface of the right output shaft 76 and on the inner peripheral surface of the sleeve 69, respectively. Between the engaging surfaces 78 and 79, a rotatable large-diameter control cage 80 and a small-diameter fixed cage 81 pinned to the right output shaft 76.

Figure 15:
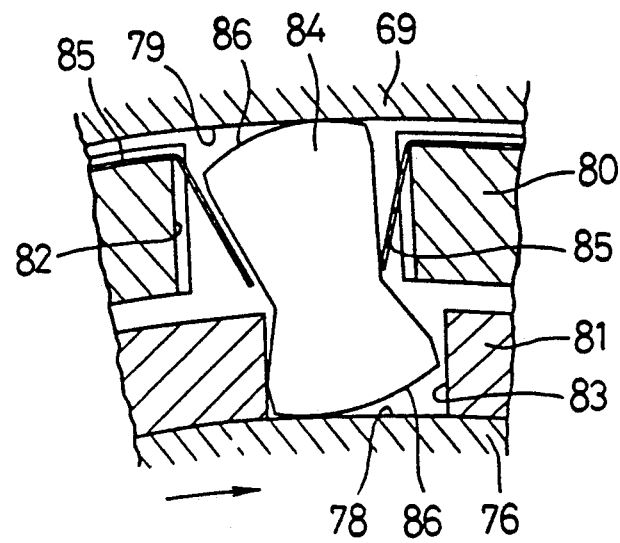
FIG. 15 is a sectional view of the same showing how it operates.

The cages 80 and 81 have a plurality of pockets 82 and 83, respectively, in their peripheral surfaces so as to be opposite to each other. (FIG. 13) In each pair of the pockets 82 and 83, a sprag 84 as an engaging element and elastic members 85 are mounted. As shown in FIG. 15, each sprag 84 has arcuate surfaces 86 having their centers of curvature located on the central axis of the sprag. When the sprags 84 are inclined by a predetermined angle in either direction, they will engage between the engaging surfaces 78 and 79, thus coupling the input member 61 and the right output shaft 76 together. The elastic members 85 are secured to the control cage 80 to press the sprags 84 from both sides thereof and thus to normally keep them in their neutral position where they are not engaged in between the engaging surfaces 78 and 79.

On the other hand, the right output shaft 76 is provided in its end facing the side gear 73 with an axial hole 87 into which an intermediate shaft 88 is rotatably inserted. The side gear 73 is fastened to one end of the intermediate shaft 88 through a press-fitted spline 89.

A pin 91 is provided to extend diametrically through a pin hole 90 formed in the right output shaft 76 and the other end of the intermediate shaft 88. The control cage 80 is coupled to both ends of the pin 91.

Figure 14:
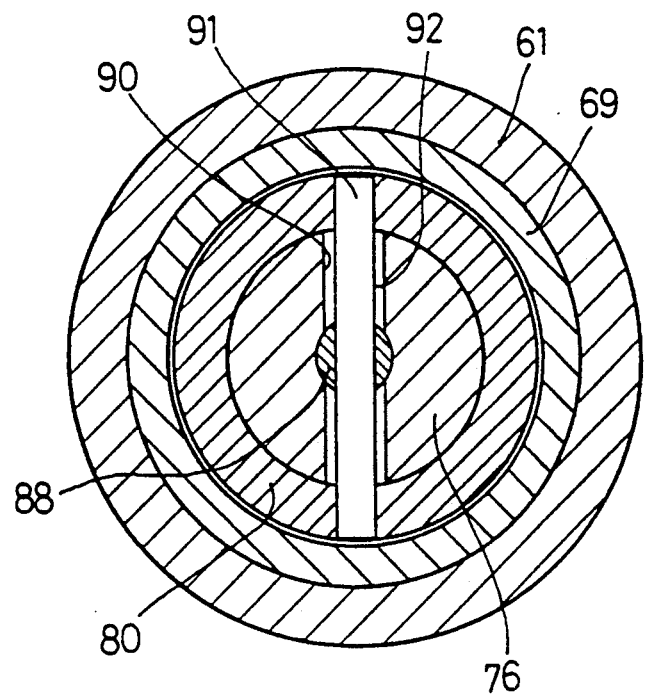
FIG. 14 is a sectional view taken along line XIV—XIV of FIG. 12.

The pin 91 is coupled to the cage 80 and the right output shaft 76 tightly with no gaps provided therebetween as shown in FIG. 14, whereas the pin 91 extends loosely through the pin hole 90 to form a gap 92 therebetween extending in the direction of rotation. The size of the gap 92 is set to be larger than the distance which the sprags 84 move from their neutral position until they engage the engaging surfaces 78 and 79 through the elastic members 85.

Now the operation will be described in various travelling conditions.

(a) When moving straight

As the input member 61 is turned by the drive pinion 64, the left and right side gears 72 and 73 will be rotated in the same direction through the support shaft 70 and the pinion gears 71.

In this case, at the lefthand side of the input member 61, the driving torque is transmitted directly from the side gear 72 to the left output shaft 75, whereas at the righthand side, the intermediate shaft 88 rotates together with the side gear 73. Thus, as shown in FIG. 15, the control cage 80 will rotate with respect to the fixed cage 81 by a distance equal to the size of the gap 92 extending in the direction of rotation so that the sprags 84 will engage the engaging surfaces 78 and 79. Now the driving torque is transmitted from the input member 61 to the right output shaft 76 through the sprags 84.

Thus, while the car is moving straight, both the left and right output shafts 75 and 76 are driven at the same time by the input member 61, so that the driving force is distributed uniformly to the output shafts 75 and 76.

(b) When making a right turn

When the car is making a right turn in FIG. 16, due to the difference in turning radius between the right and left wheels, the right output shaft 76, which is located at the inner side of turning, rotates slower than the input member 61, whereas the left output shaft 75, located outside of turning, rotates faster than that.

In this state, the left side gear 72 tends to rotate faster than the input member 61 and the pinion gears 71 begin to rotate accordingly. This rotation of the pinion gears 71 acts to rotate the right side gear 73 in the direction opposite to the direction in which the left side gear 72 rotates.

Thus, from the state of FIG. 15, the control cage 80 will rotate in the direction opposite to the direction in which the input member 61 rotates. The sprags 84 are disengaged and the input member 61 and the right output shaft 76 are separated from each other. In this state, the driving torque is transmitted from the pinion gears 71 through right side gear 73, intermediate shaft 88 and pin 91 to the right output shaft 76.

Thus, driving torque is transmitted to the left and right output shafts 75 and 76 through the pinion gears 71 rotatable relative to the side gears 72 and 73, so that any difference in revolving speed produced between the output shafts 75 and 76 is absorbed by the differential function of the side gears and the pinion gears.

(c) When making a left turn

When the car is making a lefthand turn, in contrast to the above, the left output shaft 75, which is located inside with respect to the turning of the car, rotates slower than the input member 61, while the right output shaft 76, which is located outside of turning, rotates faster.

In this case, at the lefthand side of the input member 61, driving torque is transmitted from the pinion gear 71 to the left output shaft 75 through the side gear 72, while at the righthand side, since the right output shaft 76 rotates faster than the input member 61, the sprags 84 are kept out of engagement with the engaging surfaces 78 and 79 and the input member 61 and the right output shaft 76 are separated from each other. In this state, driving torque is transmitted to the right output shaft 76 through the pinion gear 71, right side gear 73, intermediate shaft 88 and pin 91. As described in (b) and (c), while the car is turning, the left and right output shafts 75 and 76 are separated from the input member 61 and are rotated through the pinion gears 71 and the side gears 72 and 73. In this state, only the differential function of the pinion gears and side gears acts, so that any difference in revolving speed between the left and right output shafts will be effectively absorbed and driving torque is distributed to the respective output shafts according to the loads on the left and right wheels.

Further, since while turning the sprags 84 are kept disengaged from the engaging surfaces 78 and 79 and thus the input member 61 and the output shafts 75 and 76 are separated from each other, no dragging torque is produced even while the car is turning a tight corner at a low speed.

(d) If the left wheel falls into unloaded condition

If the left wheel should get off the track or the road surface or if it should move onto a frozen or snow-covered road surface, no load acts on the left output shaft 75, with only the right output shaft 76 coupled to the right wheel put under load.

In this state, as the input member 61 is rotated by the drive pinion 64, the pinion gears 71 tend to rotate the left and right side gears 72 and 73. In this case, when the intermediate shaft 88 is rotated by the right side gear 73, the sprags 84 will engage due to the relative rotation between the control cage 80 and the right output shaft 76. Thus, the right output shaft 76 is rotated directly by the input member 61 through the sprags 84. In this state, since no load is applied from the pinion gears 71 to the side gears 72 and 73 and vice versa, they rotate together with the input member 61 while not rotating relative to each other.

Thus, the left and right output shafts 75 and 76 rotate at the same speed with the differential function locked, so that the driving torque is transmitted to the right output shaft 76, which is drivable. Thus the car can keep moving.

(e) If the right wheel falls into unloaded condition

In this case, no load acts on the right output shaft 76. Only the left output shaft 75 coupled to the left wheel can be driven.

In this state, as the input member 61 is rotated by the drive pinion 64, the pinion gears 71 tend to rotate together with the left and right side gears 72 and 73 due to the rotation of the input member. In this state the resistance from the road surface is being applied to the left side gear 72 through the left wheel. This resistance acts to rotate the pinion gears 71.

By this movement of the pinion gears, the right side gear 73 rotates forward. This in turn rotates the intermediate shaft 88, so that the sprags 84 will engage the engaging surfaces 78 and 79. Thus, the right output shaft 76 is rotated directly by the input member 61.

If the right output shaft 76 is driven directly by the input member 61, the differential function is locked as described above, allowing both side gears 72 and 73 to rotate with the input member 61. Now the driving torque is transmitted to the left output shaft 75 as well, so that the car can be moved.

This operation applies not only to the rotation of the input member 61 in one direction. If the drive pinion 64 rotates in the direction opposite to the above, the control cage 80 will rotate in reverse, so that the sprags 84 will engage the engaging surfaces 78 and 79 in an opposite direction to the above. Thus, the above-described operation is carried out in exactly the same manner either for forward or backward drive.

Figure 17:
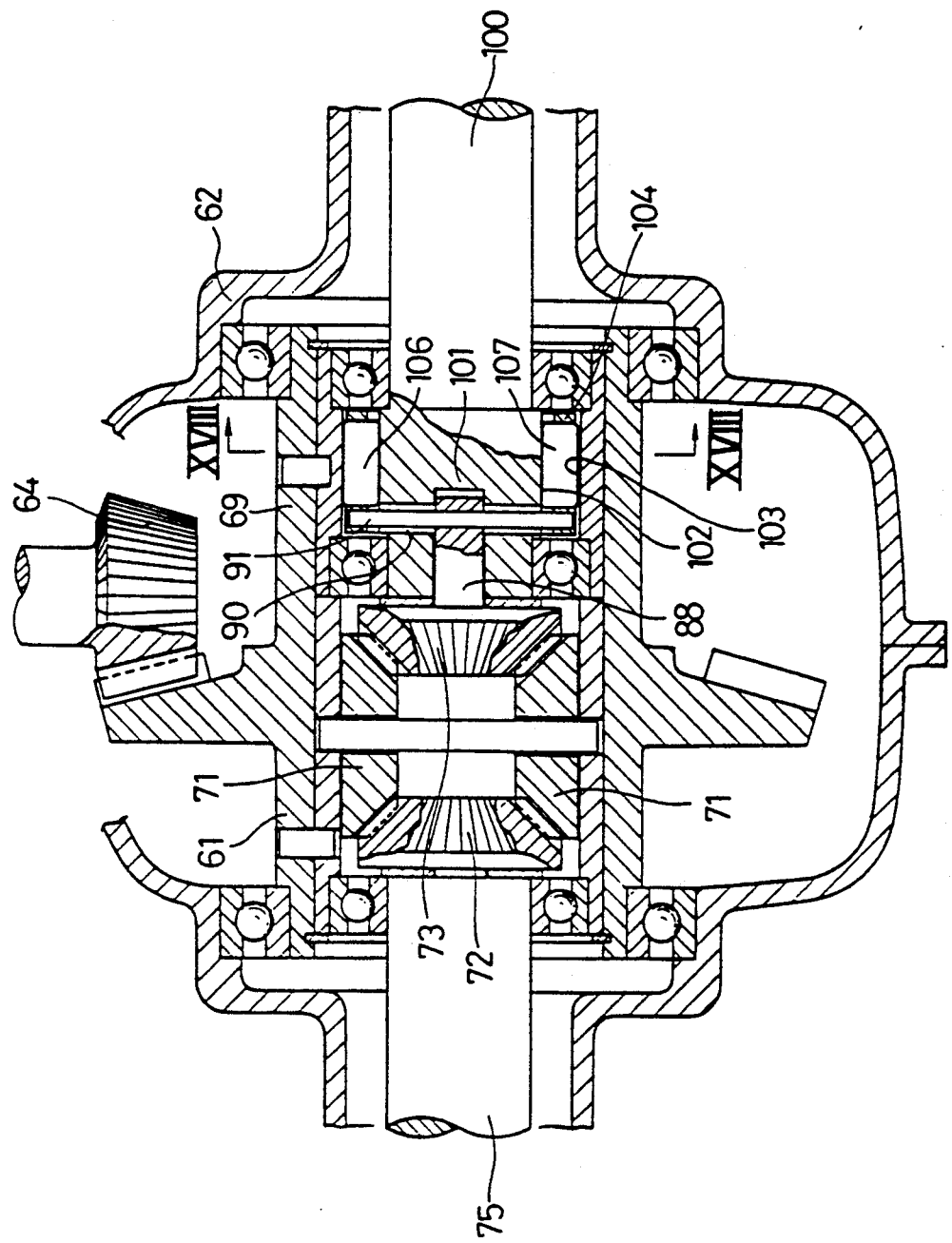
FIG. 17 is a vertical sectional front view of a portion of a fourth embodiment.
Figure 18:
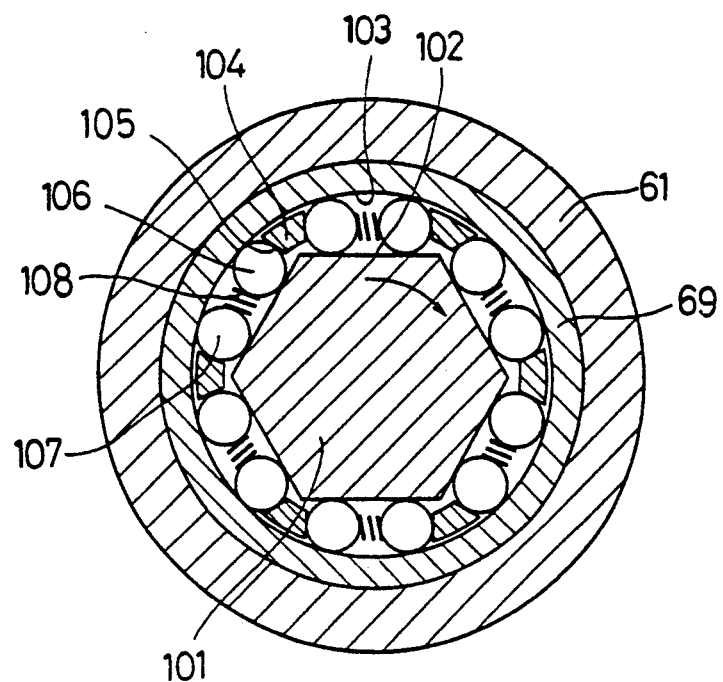
FIG. 18 is a sectional view taken along line XVIII—XVIII of FIG. 17.

FIGS. 17 and 18 show the fourth embodiment, in which a right output shaft 100 has its peripheral surface which opposes the sleeve 69 of the input member 61 formed into a square portion 101. The square portion 101 is provided on the outer periphery thereof with a plurality of engaging surfaces 102 which define a wedge-shaped space in cooperation with a cylindrical engaging surface 103 of the sleeve 69.

An annular cage 104 having pockets 105 is mounted between the engaging surfaces 102 and 103. Each pocket 105 accommodates a pair of rollers 106 and 107 as engaging elements and an elastic member 108 for pressing the rollers 106 and 107 against the circumferentially opposite side faces of the pocket 105.

In this arrangement, as the intermediate shaft 88 rotates and the cage 104 rotates in either direction with respect to the right output shaft 100, the rollers 106 and 107 are urged in such way that one of the rollers engage the engaging surfaces 102 and 103 alternately, thus coupling the input member 61 and the right output shaft 100 together.

Otherwise, this embodiment is the same in structure and function as the third embodiment. Thus, like parts are denoted like numerals and their description is omitted.

In the third and fourth embodiments, as the engaging elements to be mounted between the input member and the output shafts, pairs of sprags may be used, one of each pair being adapted to engage depending upon the direction of rotation.

The rotation transmitting devices of the third and fourth embodiment can also be used as a front differential coupled to the front wheel axles of a front-wheel drive vehicle or as a differential for a four-wheel drive vehicle.

Figure 20:
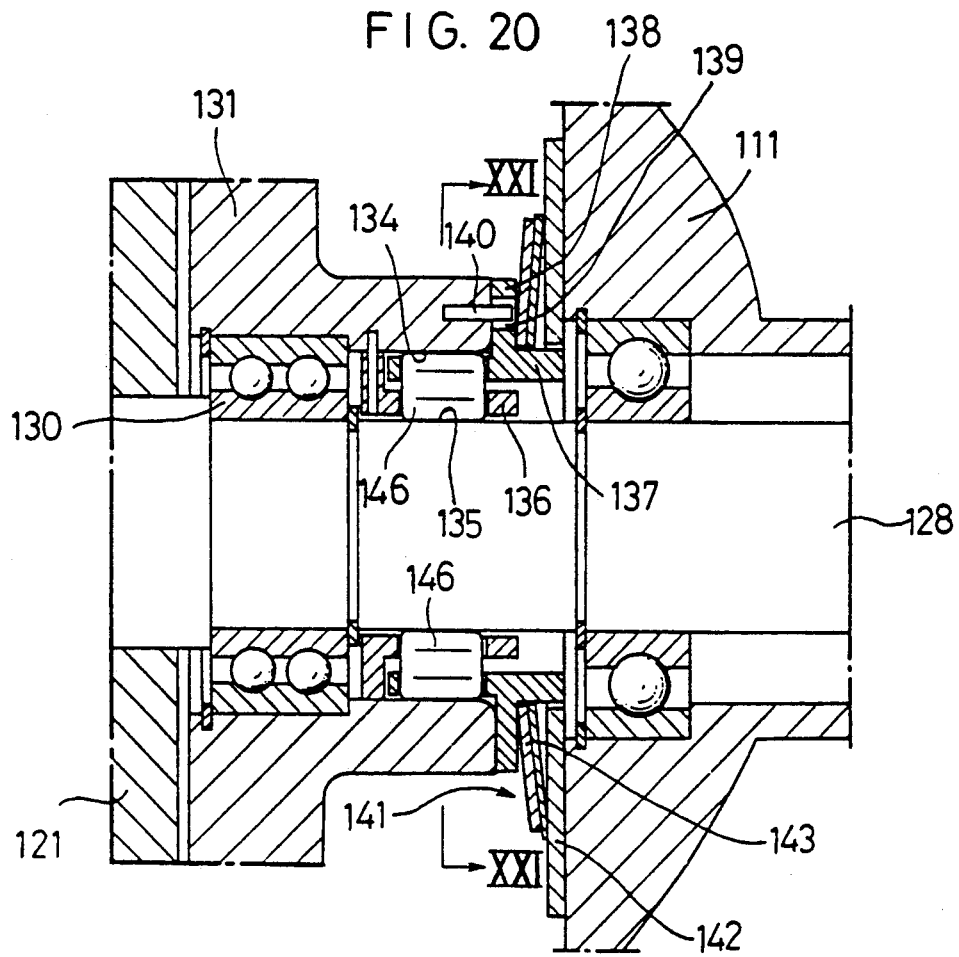
FIG. 20 is an enlarged vertical sectional front view of a portion of the same.
Figure 19:
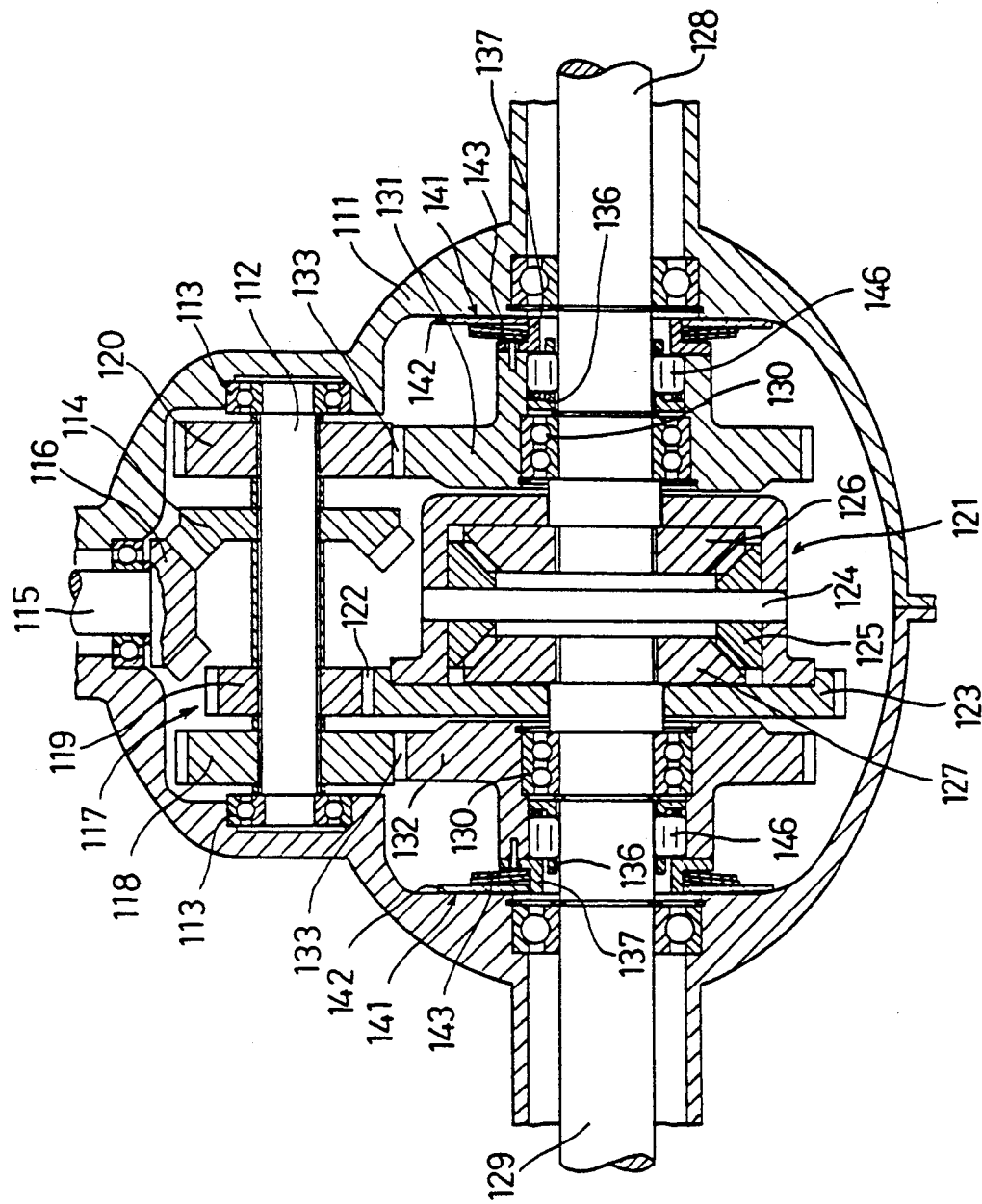
FIG. 19 is a vertical sectional front view of a fifth embodiment.
Figure 21:
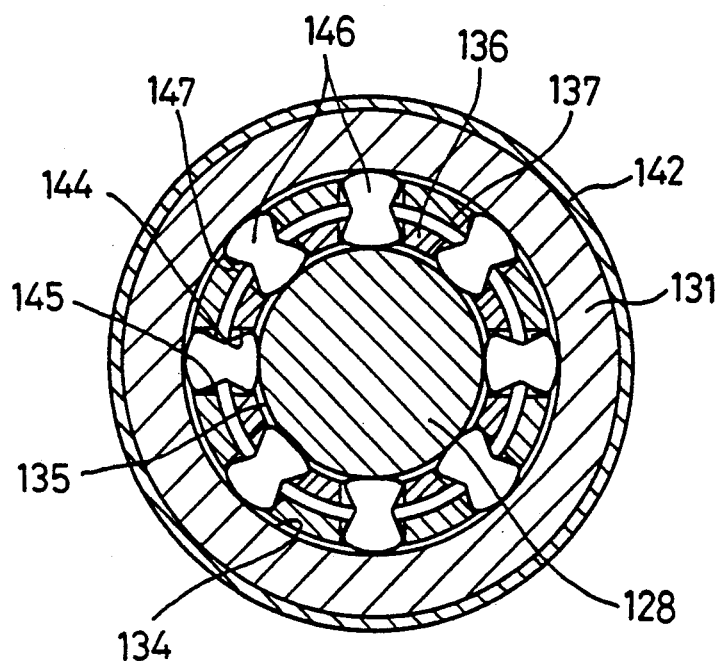
FIG. 21 is a sectional view taken along line XXI—XXI of FIG. 20.

FIGS. 19-21 show the fifth embodiment.

As shown in FIG. 19, an input shaft 112 is rotatably mounted in a housing 111 by bearings 113. A bevel gear 114 secured to the input shaft 112 is in meshing engagement with a pinion gear 116 coupled to an external drive shaft 115.

Three change gears 118, 119 and 120 forming a transmission mechanism 117 are mounted on the input shaft 112. The center gear 119 meshes with a ring gear 122 provided on the outer peripheral surface of a differential 121. The differential 121 comprises a differential case 123, pinion gears 125 coupled to the differential case 123 through a support shaft 124 and an opposed pair of side gears 126 and 127 meshing with the pinion gears 125. As the differential case 123 is rotated by the gear 119, a turning force is transmitted to the side gears 126 and 127 through the pinion gears 125. If there is a difference in revolving speed between the side gears 126 and 127, the pinion gears 125 and the side gears 126 and 127 will rotate relative to each other, thus absorbing the difference in revolving speed so that turning forces depending on load are transmitted to the respective side gears 126 and 127.

The side gears 126 and 127 of the differential 121 are coupled to the output shafts 128 and 129 rotatably supported on the housing 111. Outer rings 131 and 132 are rotatably supported on the output shafts 128 and 129 through bearings 130. The outer rings 131 and 132 are provided on their outer peripheral surfaces with gear teeth 133 meshing with the gears 118 and 120 on both sides of the input shaft 112.

The gear ratios at the meshing portions between the gears 118 and 120 and the outer rings 131 and 132 are set to be larger than the gear ratio at the meshing portion between the center gear 119 and the differential 121, so that when the input shaft 112 rotates, both outer rings 131 and 132 rotate faster than the differential case 123.

As shown in FIGS. 20 and 21, the outer rings 131 and 132 and the output shafts 128 and 129 have their respective inner and outer opposing surfaces formed into coaxial cylindrical surfaces 134 and 135. Between the cylindrical surfaces 134 and 135, small-diameter fixed cages 136 pinned to the outer rings 131 and 132 and large-diameter control cages 137 are mounted. The control cages 137 are provided on their outer peripheral surfaces with flanges 138 formed with pin holes 139 in which pins 140 secured to the end faces of the outer rings 131 and 132 are loosely inserted, so that the cages 137 are rotatable together with the outer rings. But the control cages 137 and the outer rings 131, 132 can rotate relative to each other by a distance equal to gap formed in the direction of rotation between the pins 140 and the pin holes 139. The angle of delay of the control cages 137 with respect to the outer rings is determined by the size of the gaps in the direction of rotation, which size is set to be greater than the distance by which sprags 146 (to be described later) move from their neutral position between the cylindrical surfaces 134 and 135 until they contact both engaging surfaces through elastic members 147.

Differential means 141 are coupled to the control cages 137 to decelerate the rotation of the cages with respect to the outer rings. Each differential means 141 comprises a friction plate 142 secured to the housing 111 and a conical spring 143 disposed between the friction plate 142 and the flange 138 of the control cage 137. The conical springs 143 pressed against the flanges 138 slip with respect to the friction plates 142. The frictional force produced by the slipping acts to retard the rotation of the control cages with respect to the outer rings.

The control cages 137 and the fixed cages 136 have a plurality of opposing pockets 144 and 145 arranged circumferentially. In each pair of the pockets 144 and 145, there are provided a sprag 146 adapted to engage the cylindrical surfaces 134 and 135 when it inclines either clockwise or counterclockwise and elastic members 147 for keeping the sprag 146 in their neutral position where it is out of engagement.

When mounting the rotation transmitting device of the fifth embodiment on a car, the drive shaft 115 is coupled to the propeller shaft and the output shafts 128 and 129 to the wheels on both sides.

When the turning torque is transmitted from the drive shaft 115 to the input shaft 112 through the pinion gears 116 and the bevel gears 114, the differential 121 and the outer rings 131 and 132 are rotated by the three speed change gears 118, 119 and 120. In this state, due to the difference between the gear ratios of the speed change gears, the outer rings 131 and 132 are rotated faster than the differential 121.

In this state, the outer rings and the control cages 137 are rotating together, but the rotation of the control cages 137 is retarded by the action of the differential means 141 with respect to the outer rings by a distance equal to the size of the gaps provided in the direction of rotation between the pins 140 and the pin holes 139. Thus, the control cages 137 and the fixed cages 136 rotate relative to each other, allowing the sprags 146 to incline until they contact the cylindrical surfaces 134 and 135. This is the ready-to-engage stand-by position.

During a normal run of the car, since the output shafts 128 and 129 coupled to the differential 121 rotate slower than the outer rings 131 and 132, the outer rings overrun the sprags 146, disengaging the clutch. Thus, the rotation of the input shaft 112 is transmitted to the output shafts 128 and 129 through the differential 121, so that any difference in revolving speed between the wheels is absorbed by the differential function of the differential 121.

On the other hand, if one of the wheels (for example the right one in FIG. 19) slips or loses grip of the road surface, the rotation of the output shaft 128 coupled to this wheel will increase. If this rotation exceeds the rotation of the outer rings 131, the sprags 146 will engage the cylindrical surfaces 134 and 135 instantly. Thus, the rotation of the input shaft 112 is transmitted from the outer ring 131 directly to the output shaft 128, locking the differential 121. The driving force is now transmitted to the other output shaft 128 as well and thus to the wheel gripping the road surface firmly. This ensures a stable run of the car.

The clutch is switched on and off automatically according to the difference between the revolving speeds of the differential 121 and the outer rings 131 and 132 and the numbers of revolutions of the output shafts 128 and 129. Thus, by setting the above difference in revolving speed to a greater value than the difference in revolving speed between the front and rear wheels during a minimum turning of the car in a normal condition, the differential function can be automatically locked if one of the wheels should slip or lose contact with the road surface. This ensures stable run of the car.

In the above arrangement, if the direction in which the input shaft 112 is rotated by the drive shaft 113 is reversed, the sprags 146 will incline in the opposite direction and engage the cylindrical surfaces 134 and 135. Thus, the differential limiting function works in exactly the same manner when the car is moving either forward or backward.

Figure 22:
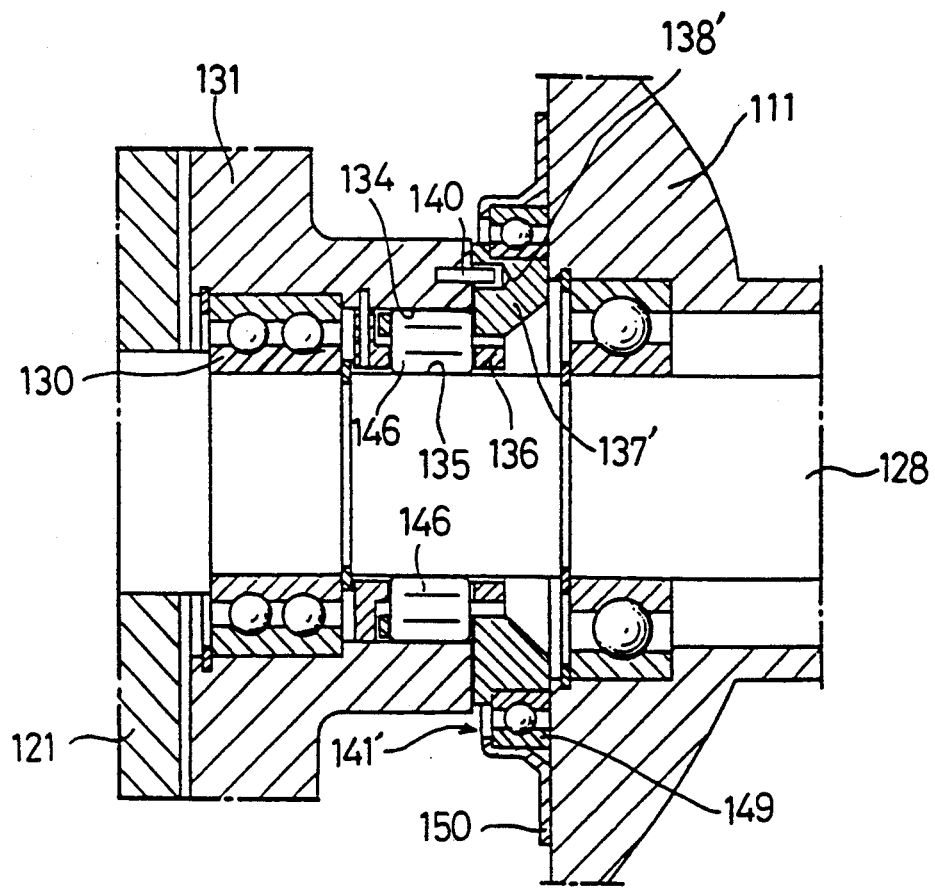
FIG. 22 is a vertical sectional front view of a sixth embodiment.

FIG. 22 shows the sixth embodiment in which different differential means are used. A differential means 141' of this embodiment comprises a differential bearing 149 having its inner ring fitted on a flange 138' of a control cage 137' and a support frame 150 coupling the differential bearing 149 to the housing 1. The support frame 150 is mounted so as to permit an outward dimensional expansion of an outer ring of the differential bearing 149 but prevent its rotation.

The differential bearing 149 has a zero or less radial gap and is put under preload higher than a normal pressure to increase its resistance to rotation. This resistance to rotation serves to decelerate the control cage 137' and thus to rotate it slower than the outer ring 131.

In the fifth and sixth embodiments, we illustrated as the engaging elements the sprags 146 which take an engaging position by inclining either clockwise or counterclockwise. In place of this arrangement, sprags engageable in one direction only may be arranged symmetrically or rollers may be used.

In the fifth and sixth embodiments, the rotation transmitting device is used as a wheel differential. But it can be used as a center differential of a four-wheel drive vehicle, in which case the drive shaft 115 coupled to the input shaft 112 is connected to the input shaft of the engine, one of the two output shafts 128 and 129 to the outputs shafts of the front wheels and the other to the rear wheel output shafts.

What is claimed is:

1. A rotation transmitting device, comprising: a pair of output shafts, a pair of side gears opposed to said output shafts, an input member, pinion gears coupled to said input member, said pinion gears meshing with said side gears, one of said side gears being coupled to one of said output shafts and the other being separated from the other of said output shafts, said other of said output shafts and said input member being provided on their surfaces opposite to each other with engaging surfaces, a cage rotatably mounted between said engaging surfaces and having pockets formed therein, engaging elements mounted in said pockets and adapted to engage said engaging surfaces when said cage and said other of said output shaft rotate relative to each other, and elastic members mounted in said pockets for keeping said engaging elements out of engagement with said engaging surfaces, an intermediate shaft provided coaxially with said other of said output shafts, said cage and said other output shaft and said other side gear being coupled together through said intermediate shaft so that turning torque can be transmitted therebetween, said intermediate shaft and said other of said output shafts being loosely coupled together with gaps formed therebetween in the direction of rotation.

2. A rotation transmitting device comprising a differential comprising a case, an opposed pair of side gears, and pinion gears rotatable together with said case and meshing with said side gears, a pair of output shafts coupled to said respective side gears, a pair of outer rings rotatably mounted on said output shafts, cages provided between said respective output shafts and said outer rings and adapted to rotate together with said output shafts or said outer rings with gaps formed in the direction of rotation therebetween, said cages having pockets, engaging elements mounted in said pockets and engageable between opposing surfaces of said output shafts and said outer rings when said output shafts and said cages rotate relative to each other either clockwise or counterclockwise, elastic members mounted in said pockets for keeping said engaging elements in their neutral position where said engaging elements are out of engagement with said opposing surfaces, said case of said differential and said outer rings being coupled to said input shaft so as to be rotatable together, transmission means provided at the coupling portions for increasing the revolving speeds of both said outer rings, and differential means for producing a revolving speed difference between said cages and said output shafts or said outer rings coupled thereto.

* * * * *